United States Patent [19]

Tanaka et al.

[11] 3,921,058
[45] Nov. 18, 1975

[54] DEVICE FOR COMPENSATING AC POWER SOURCE VOLTAGE

[75] Inventors: Masaru Tanaka, Toyonaka; Takeshi Oku, Kawanishi; Yoshimitsu Matsumoto, Toyonaka, all of Japan

[73] Assignee: Matsushita Electric Industrial Co., Ltd., Osaka, Japan

[22] Filed: Jan. 23, 1974

[21] Appl. No.: 435,949

Related U.S. Application Data

[63] Continuation of Ser. No. 298,284, Oct. 17, 1972, abandoned.

[30] Foreign Application Priority Data

Oct. 19, 1971  Japan.............................. 46-82685

[52] U.S. Cl. .................... 323/19; 219/108; 323/24; 323/34; 323/106; 323/125
[51] Int. Cl.² .................... B23K 9/06; G05F 1/56
[58] Field of Search ............. 219/108, 115; 321/16; 323/16, 19, 24, 34, 36, 106, 109, 323/122, 125, 126

[56] References Cited
UNITED STATES PATENTS

| | | | |
|---|---|---|---|
| 2,393,884 | 1/1946 | Callender.......................... | 323/24 X |
| 2,617,977 | 11/1952 | Large................................ | 323/36 X |
| 3,128,422 | 4/1964 | Brown............................... | 323/34 X |
| 3,233,165 | 2/1966 | Bedford............................ | 323/34 X |
| 3,351,810 | 11/1967 | Moerkens........................ | 323/36 UX |
| 3,502,960 | 3/1970 | Roderer............................ | 323/36 X |
| 3,504,270 | 3/1970 | Harada ............................. | 323/34 X |
| 3,646,423 | 2/1972 | Tatematsu et al................ | 323/24 X |

Primary Examiner—A. D. Pellinen
Attorney, Agent, or Firm—Burgess, Ryan and Wayne

[57] ABSTRACT

The power source voltage is detected beforehand through a filter and phase shifter. When the detected voltage reaches the reference voltage through comparison of the detected voltage and the reference voltage, the conduction phase is controlled by turning a phase-controlled rectifier connected in series with the power source circuit, and the amount of the power source current is controlled with respect to time to compensate the effective primary terminal voltage of the power source transformer. When the power source voltage is high, current flows for a short. And when it is low, current flows for a longer period of time.

3 Claims, 4 Drawing Figures

DEVICE FOR COMPENSATING AC POWER SOURCE VOLTAGE

This is a continuation of application Ser. No. 298,284, filed Oct. 17, 1972, and now abandoned.

BACKGROUND OF THE INVENTION

The present invention relates to a device for compensating AC power source voltage.

Generally speaking, the effect of spot-welding carried out by using a resistance welding machine depends on the product of Joule's heat given to the material to be welded, i.e., it depends on the factor given by the formula given below;

(welding current)$^2$ × (resistance of the material to be welded + resistance between electrode and material to be welded) × (current flowing time)

Thus, the amount of welding current is a large factor for determining the effect of spot-welding. Therefore, even if the power source voltage is changed when the welding current is to be kept constant, the results of spot-welding can be remarkably improved.

Regarding the conventional device of the above mentioned type, the closed-loop control system wherein welding current is detected through a current transformer, and the detected current is subjected to square integration through an integrator and the value obtained by multiplying the square-integrated value and flowing time is controlled to be constant, can be given as an example. Generally speaking, the flowing time of resistance welding is from several cycles to several tens of cycles, and therefore no satisfactory welding result can be obtained in accordance with the closed-loop control system because of control time delay. On the other hand, the circuit structure thereof is very complicated, expensive, and is hardly practical.

SUMMARY OF THE INVENTION

One of the objects of this invention is to provide a device for compensating AC power source voltage capable of keeping the welding current constant by controlling the effective voltage supplied to the welding machine even if the power source voltage should be changed, and in particular, capable of providing sufficient compensating current even if the transient voltage change of the power source should be caused by a momentary load.

Another object of this invention is to provide an economical, and productive device of remarkably simple circuit structure capable of avoiding the disadvantages of the conventional devices due to control time delay.

In accordance with the present invention, the phase shifting of power source voltage is carried out by a phase shifter, and the momentary power source voltage is detected in advance, and when the detected power source voltage is lower than the reference voltage, the conduction phase of the thyrister provided in the power source circuit is increased. On the other hand, when the detected power source voltage is higher than the reference voltage, it is controlled to reduce the conduction phase so that the effective primary terminal voltage of the welding transformer can be kept constant. Further, in accordance with this invention, sufficient compensation can be provided by detecting the power source voltage by way of a filter against the momentary change of power source voltage caused by a momentary load.

Other objects and features of the present invention will be clarified more in detail by the detailed explanations of the embodiments of this invention given in the following paragraphs in accordance with the attached diagrams.

DESCRIPTION OF PREFERRED EMBODIMENT

Figure 1:
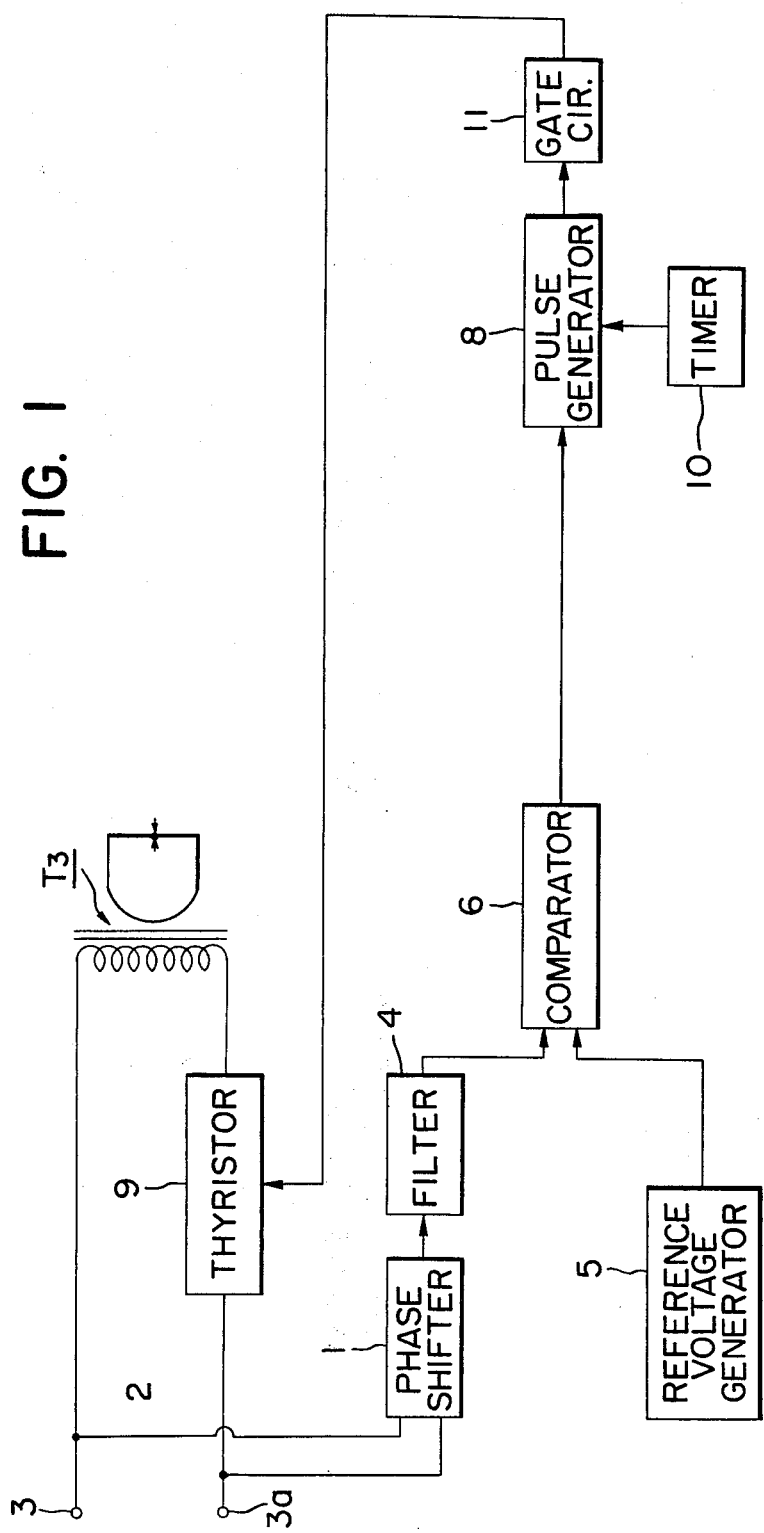
FIG. 1 shows the block-diagram of an embodiment of this invention.

In the attached drawings, numeral 1 designates the phase shifter connected to the power source terminals 3, 3a of the power source circuit 2, for advancing the phase of power source voltage. Numeral 4 designates a low pass filter or band pass filter of frequency characteristics to prevent the transmission of high frequency signals; 5, a reference voltage generator; 6, a comparator for comparing the output voltage of said filter 4 and the reference voltage of the reference voltage generator 5; 8, a pulse generator for converting the output signal from said comparator into 6 pulses; 9, a thyrister provided in the power source circuit 2; 10, a timer for giving a welding signal, and unless said timer 10 is operated, the pulse output of said pulse generator 8 is not produced. Numeral 11 designates a gate for transmitting only the gate signal in the forward direction to said thyrister 9.

Figure 2:
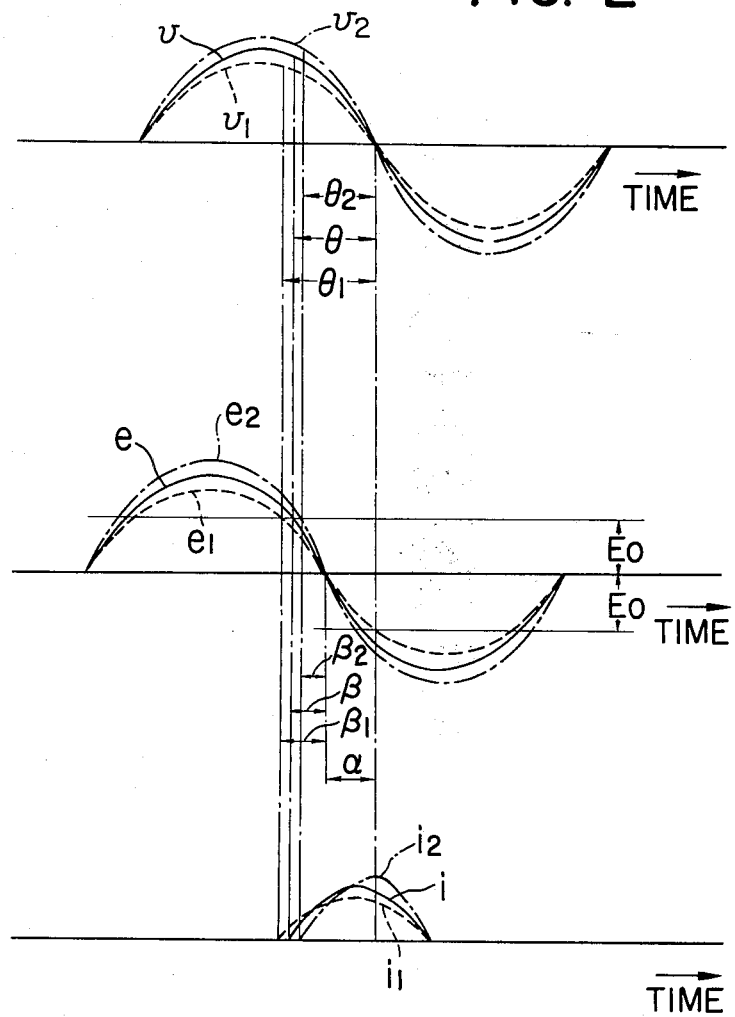
FIG. 2 shows the relation between the value of power source voltage, the value and phase shifting of the detected voltage, the value of rectified current and phase, to explain the operations of the device of this invention.

In the following paragraphs, the operation is explained in accordance with FIG. 2.

When AC power source voltage is the rated value of "$v$", the welding current $i$ flows at the conduction phase $\Theta$ of the power source. Next, when the power source voltage is reduced to $v_1$, the power source conduction phase $\Theta_1$ is determined in such a manner that the welding current $i_1$ can become the same effective value as said current $i$. On the other hand, when the power source voltage is increased to $v_2$, the power source conduction phase $\Theta_2$ is determined in such a manner that the welding current $i_2$ can become the same effective value as said current $i$.

Next, the phase shifter 1 and the filter 4 are provided in such a manner that the phase of the output voltage of the filter 4 can be leading by an angle $\alpha$ with respect to the power source voltage by the phase shifter 1, and the output voltage of the filter 4 against the power source voltages $v$, $v_1 v_2$, can become proportionally $e$, $e_1$, $e_2$.

The reference voltage generator 5 and the phase shifter 1 are adjusted in such a manner that the crossing point of the output voltage of the filter 4 and the reference voltage $E_o$ can become respectively $\alpha + \beta = \Theta$, $\alpha + \beta_1 = \Theta_1$, and $\alpha + \beta_2 \approx \Theta_2$. The lead angle of the phase of the output voltage of the filter 4 is set to be $\alpha$, and the timer 10 is operated on the crossing point thereof to control the conduction phase of the thyrister by generating a pulse from the pulse generator 8, and the effective welding current can be always kept constant. Thus, when the power source voltage is reduced to $v_1$, the conduction phase of the thyrister 9 is increased to $\Theta_1$, and on the other hand when the power source voltage is increased to $v_2$, the conduction phase of the thyrister 9 is reduced to $\Theta_2$, and the effective welding current can be always kept constant without being effected by the change of power source voltage.

Figure 3:
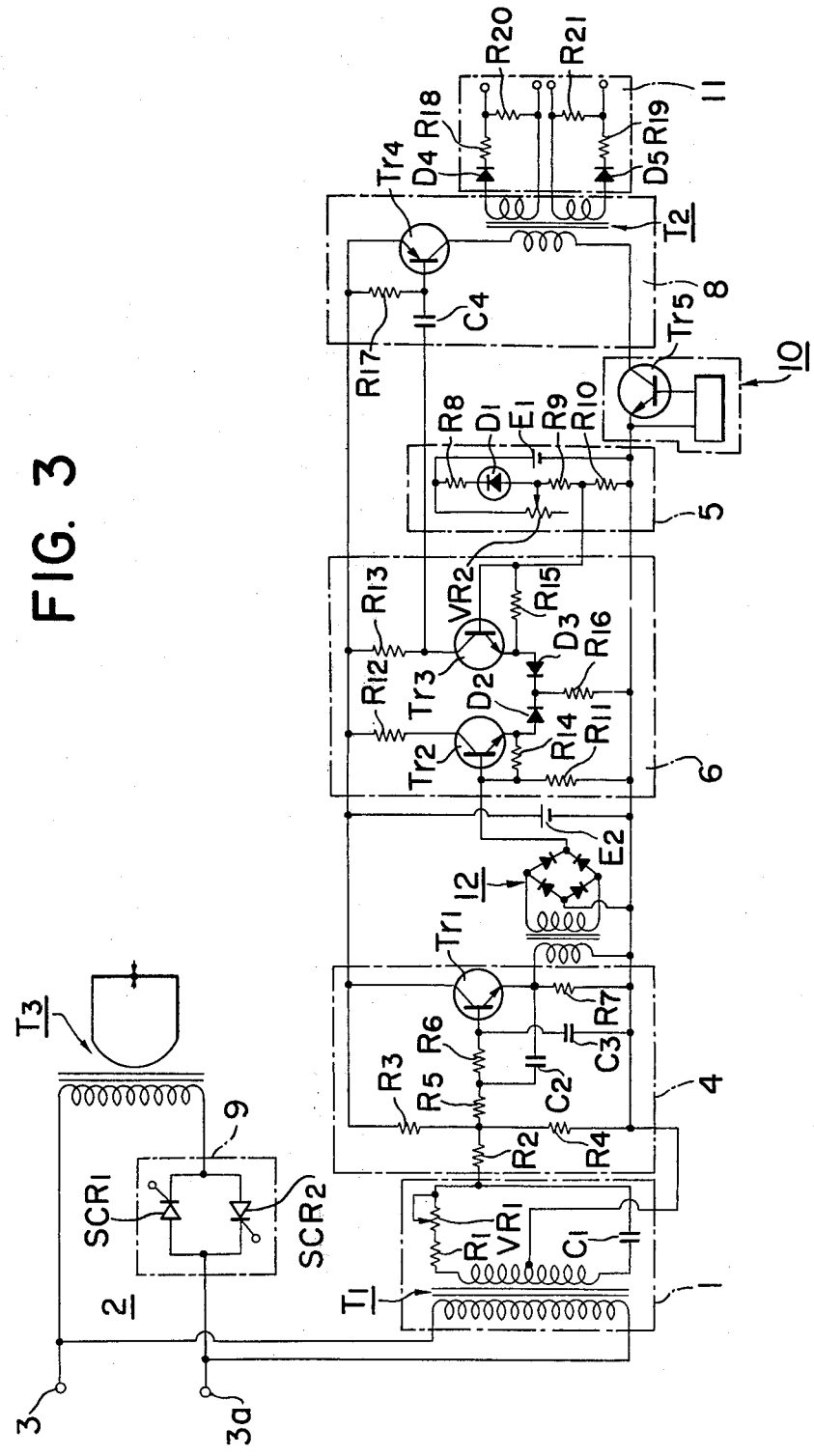
FIG. 3 shows a detailed embodiment of the circuit of FIG. 1.

FIG. 3 shows the structure of each circuit of the block diagram of FIG. 1, and as is shown in FIG. 3, the phase shifter 1 is composed of the transformer $T_1$, the variable resistance $VR_1$, the condenser $C_1$, and the resistor $R_1$, and said phase shifter 1 can shift the phase of power source voltage by $0 \sim 180°$ through the control of the variable resistance $VR_1$. Said filter 4 is composed of the transistor $Tr_1$, the resistors $R_2 R_3$, $R_4$, $R_5$, $R_6$, and $R_7$, and the condensers $C_2$ and $C_3$, and in the case of this embodiment, a low pass filter is formed. Said reference voltage generator 6 is composed of DC power source $E_1$, the constant voltage diode $D_1$, the variable resistance $VR_2$, and the resistors $R_8$, $R_9$, and $R_{10}$.

Resistor $R_8$ is for controlling current.

Comparator 6 is composed of the transistors $Tr_2$, $Tr_3$, the diodes $D_2$, $D_3$, the resistors $R_{11}$, $R_{12}$, $R_{13}$, $R_{14}$, $R_{15}$, $R_{16}$, and DC power source $E_2$. Pulse generator 8 is composed of the transistor $Tr_4$, the pulse transformer $T_2$, the resistor $R_{17}$, and the condenser $C_4$, and the output of said comparator 6 is passed through the condenser $C_4$ to pass a differential signal current to the base of the transistor $Tr_4$, and the pulse voltage is generated on the secondary side of the pulse transformer $T_2$. Thyrister 9 is composed of two thyristers $SCR_1$ and $SCR_2$ connected in parallel in the opposite direction. The timer 10 is mainly composed of the transistor $Tr_5$, and only when a conduction siganl is given to the transistor $Tr_3$, output voltage comes out from the pulse transformer $T_2$. The gate 11 is composed of the gate diodes $D_4$, $D_5$ and the resistors $R_{18}$, $R_{19}$, $R_{20}$, and $R_{21}$, and both ends of the resistances $R_{20}$ are connected to the gate and cathode of said thyrister $SCR_1$ respectively, and both ends of the resistor $R_{21}$ are connected to the gate and cathode of said thyrister $SCR_2$ respectively. $T_3$ designates the transformer for welding; and 12, a all wave rectifier.

Figure 4:
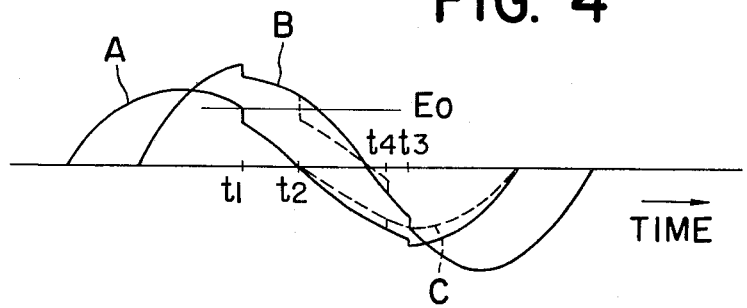
FIG. 4 shows the operation of another embodiment of this invention with and without the filter.

Next, the difference between the case where filter 4 is used and the case in which no filter 4 is used, is explained in accordance with FIG. 4.

When the filter 4 for preventing the passing of frequencies is not used, the thyrister 9 is conducted at the crossing point where the output A of the phase shifter 1 and the reference voltage $E_o$ are crossed, i.e., at the time $t_1$.

On the other hand, when the welding current is cut off at the time $t_3$, the output A of the phase shifter 1 is illustrated by the curve shown in FIG. 4. When the power source voltage B is abruptly reduced by operation of other welding machines at the time $t_2$, and the momentary load caused by other welding machines is eliminated at the time $t_4$, the same curve is drawn. Therefore, when the power source voltage is temporarily and abruptly reduced after the time $t_1$, the welding current is considerably reduced.

However, when the high frequency blocking filter 4 is used, if the power source voltage is temporarily changed after the time $t_1$, the characteristics shown by the curve C can be obtained, and the change of the power source voltage brought about after the time $t_1$ is also taken into consideration. Therefore, when the filter 4 is used, it is possible to perfectly compensate the transient change of power source voltage from the next cycle of the power source wave.

In the foregoing description, the compensation of the power source voltage for the welding machine has been explained, but the present invention can be applied to the compensation and control of the other AC power source voltage in a wider range of applications. On the other hand, if the structural order of the filter 4 and the phase shifter 1 are opposite, exactly the same effect can be obtained. The same effect can be obtained when triacs or ignitions are used in place of thyristers $SCR_1$ and $SCR_2$.

As described so far in the foregoing paragraphs, in accordance with the present invention, the effective voltage to be given to the primary terminal of the welding transformer is always constant even if the power source voltage should be changed, and therefore a homogeneous quality of spot welding can be obtained, and highly reliable spot welding can be attained.

On the other hand, when the filter is used, the transient change of power source voltage caused by a momentary load can be compensated, and the change of power source voltage where the sine wave greatly changes, can be sufficiently compensated.

Further, when the phase shifter is used, the momentary power source voltage can be detected and controlled in advance, the time lag can be completely eliminated, and therefore reliable control can be attained and excellent welding results can be obtained.

On the other hand, the circuit structure is simpler than the conventional circuit structure, and therefore production cost is low, and trouble is rarely encountered, and therefore the present invention is very advantageous.

What we claim is:

1. Device for compensating AC power source voltage comprising:
   a. a phase controlled rectifier connected in series to the primary circuit of a power source transformer;
   b. a power source voltage detector composed of a filter including RC elements and a transistor for blocking transmission of high frequencies and a phase shifter;
   c. a comparator connected to compare the detected voltage of said power source voltage detector and the reference voltage; and
   d. means for controlling the effective terminal voltage of the primary circuit of said power source transformer by controlling the conduction phase of said phase controlled rectifier in correspondence to the timing when said detected voltage becomes equal to said reference voltage.

2. Device according to claim 1 wherein said filter is a band pass filter.

3. Device according to claim 1 wherein said filter is a low pass filter.

* * * * *